(12) United States Patent
Mappes et al.

(10) Patent No.: US 9,939,660 B2
(45) Date of Patent: Apr. 10, 2018

(54) GRADIENT POLARIZED OPHTHALMIC LENS

(71) Applicant: Carl Zeiss Vision International GmbH, Aalen (DE)

(72) Inventors: Timo Mappes, Karlsruhe (DE); Michael Pittolo, Glenelg (AU); Ben Ryan, Port Noarlunga South (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/387,418

(22) Filed: Dec. 21, 2016

(65) Prior Publication Data

US 2017/0176775 A1    Jun. 22, 2017

(30) Foreign Application Priority Data

Dec. 21, 2015  (EP) .................................. 15201692

(51) Int. Cl.
  *G02C 7/12*  (2006.01)
  *G02C 7/10*  (2006.01)
  *B29D 11/00*  (2006.01)

(52) U.S. Cl.
  CPC .......... *G02C 7/12* (2013.01); *B29D 11/00865* (2013.01); *B29D 11/00894* (2013.01); *G02C 7/10* (2013.01); *G02C 7/102* (2013.01); *G02C 7/105* (2013.01); *G02C 7/108* (2013.01); *G02C 2202/16* (2013.01)

(58) Field of Classification Search
  CPC ........ G02C 2202/16; G02C 7/12; G02C 7/10; G02C 7/102; G02C 7/105; G02C 7/108; B29D 11/00894; B29D 11/00865

USPC ..................................................... 351/159.56
See application file for complete search history.

(56) References Cited

U.S. PATENT DOCUMENTS

| | | | |
|---|---|---|---|
| 2,475,921 A * | 7/1949 | Smith | G02C 7/12 156/99 |
| 2,675,740 A * | 4/1954 | Barkley | C03C 17/3417 118/503 |
| 3,211,047 A * | 10/1965 | Heimberger | B60J 3/06 351/49 |
| 4,101,302 A | 7/1978 | Krohn et al. | |
| 4,258,653 A | 3/1981 | Buzzell | |
| 4,311,368 A * | 1/1982 | Saito | G02C 7/105 351/159.64 |
| 4,338,003 A | 7/1982 | Adrian | |
| 6,177,032 B1 * | 1/2001 | Smith | B29D 11/0073 264/1.32 |
| 6,575,569 B1 | 6/2003 | Castellano | |
| 7,374,282 B2 | 5/2008 | Tendler | |
| 8,172,393 B2 | 5/2012 | Tendler | |

(Continued)

OTHER PUBLICATIONS

Extended Search Report of the European Patent Office dated Jun. 1, 2016 in European patent application 15201692.9 on which the claim of priority is based.

*Primary Examiner* — William R Alexander
(74) *Attorney, Agent, or Firm* — Walter Ottesen, P.A.

(57) ABSTRACT

A polarized ophthalmic lens has a polarization gradient with a primary light transmission gradient. The lens also includes a secondary light transmission gradient, the secondary light transmission gradient being complementary to the primary light transmission gradient such that the lens exhibits uniform light transmission.

21 Claims, 3 Drawing Sheets

(56) References Cited

U.S. PATENT DOCUMENTS

| | | | | |
|---|---|---|---|---|
| 8,596,783 | B1* | 12/2013 | Finley | G02B 27/28 |
| | | | | 351/159.27 |
| 8,651,660 | B2 | 2/2014 | Barzak et al. | |
| 9,678,364 | B2* | 6/2017 | Trapani | G02C 7/12 |
| 2005/0099588 | A1* | 5/2005 | Helpern | G02C 7/101 |
| | | | | 351/44 |
| 2007/0052918 | A1* | 3/2007 | Tendler | G02C 7/12 |
| | | | | 351/49 |
| 2007/0146574 | A1* | 6/2007 | Giraudet | A42B 3/226 |
| | | | | 349/86 |
| 2010/0091236 | A1* | 4/2010 | Matera | B29D 11/00634 |
| | | | | 351/49 |
| 2013/0329184 | A1* | 12/2013 | Barzak | G02C 7/102 |
| | | | | 351/159.56 |
| 2015/0116658 | A1* | 4/2015 | Trapani | G02C 7/12 |
| | | | | 351/178 |
| 2015/0231839 | A1* | 8/2015 | Su | G02C 7/102 |
| | | | | 351/159.61 |
| 2015/0253465 | A1 | 9/2015 | Trapani et al. | |
| 2015/0261011 | A1 | 9/2015 | Trapani et al. | |
| 2016/0223838 | A1* | 8/2016 | Martins | G02C 7/028 |
| 2016/0282637 | A1* | 9/2016 | Ryan | G02C 7/12 |
| 2016/0377886 | A1* | 12/2016 | Quiroga | G02C 7/083 |
| | | | | 349/13 |

* cited by examiner

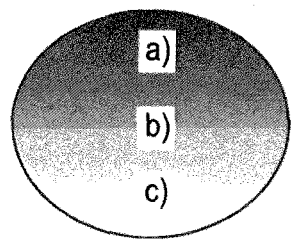
FIG. 1A
| Location | Polarised Gradient | |
|---|---|---|
| | % Transmittance (%T) | Polarising efficiency (P) |
| a) Top | <20% | >60% |
| b) Middle | 20>%T>60% | 20>P>60% |
| c) Bottom | >60% | <20% |
FIG. 1B
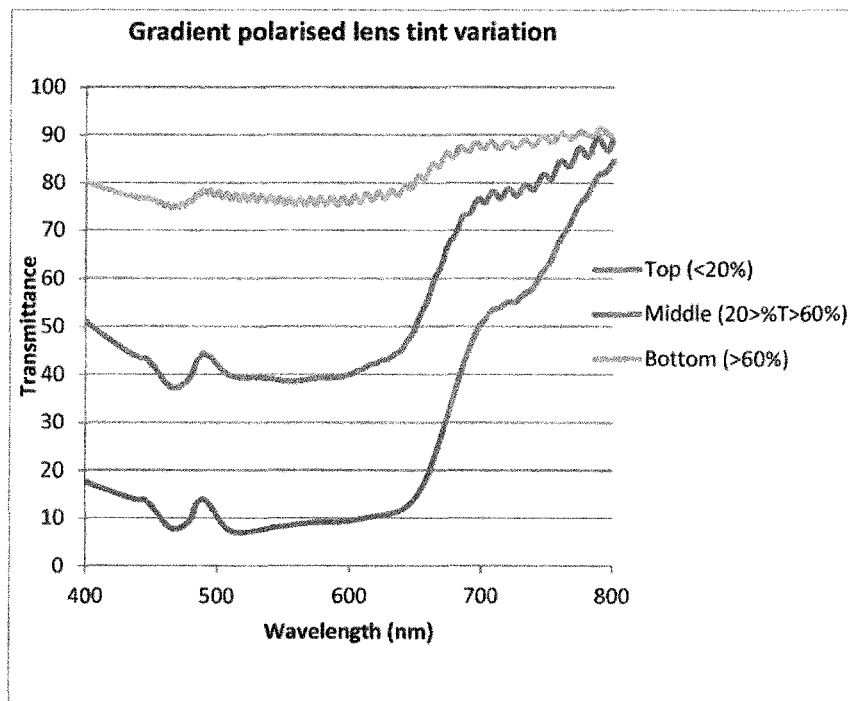
FIG. 1C

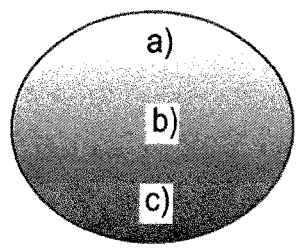
FIG. 2A
| Location | Gradient Tinted lens | |
|---|---|---|
| | % Transmittance (%T) | Polarising efficiency (P) |
| a) Top | >60% | 0% |
| b) Middle | 20>%T>60% | 0% |
| c) Bottom | <20% | 0% |
FIG. 2B
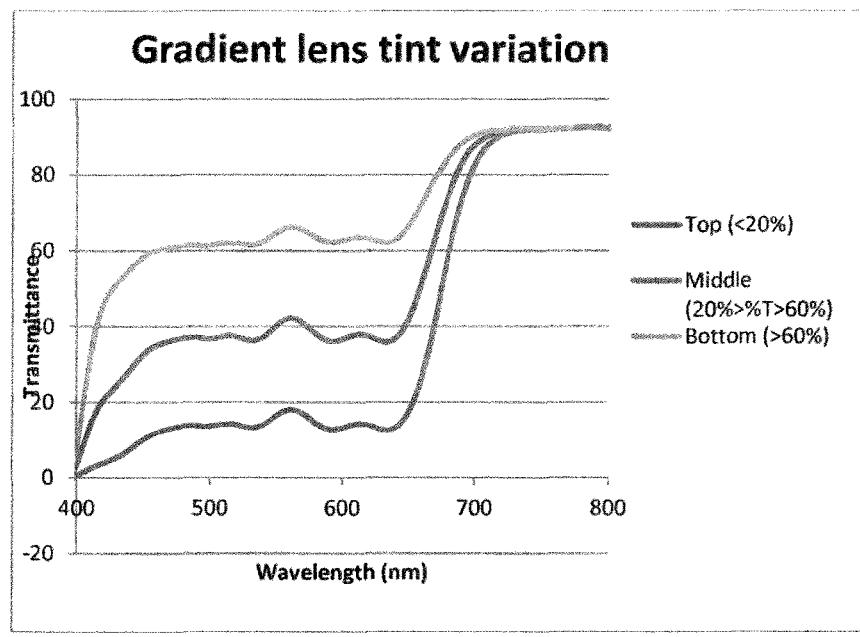
FIG. 2C

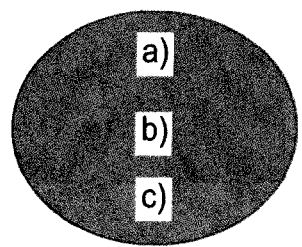
FIG. 3A
| Location | Gradient Tinted lens | |
|---|---|---|
| | % Transmittance (%T) | Polarising efficiency (P) |
| a) Top | <15% | >70% |
| b) Middle | <15% | 30>P>70% |
| c) Bottom | <15% | <30% |
FIG. 3B
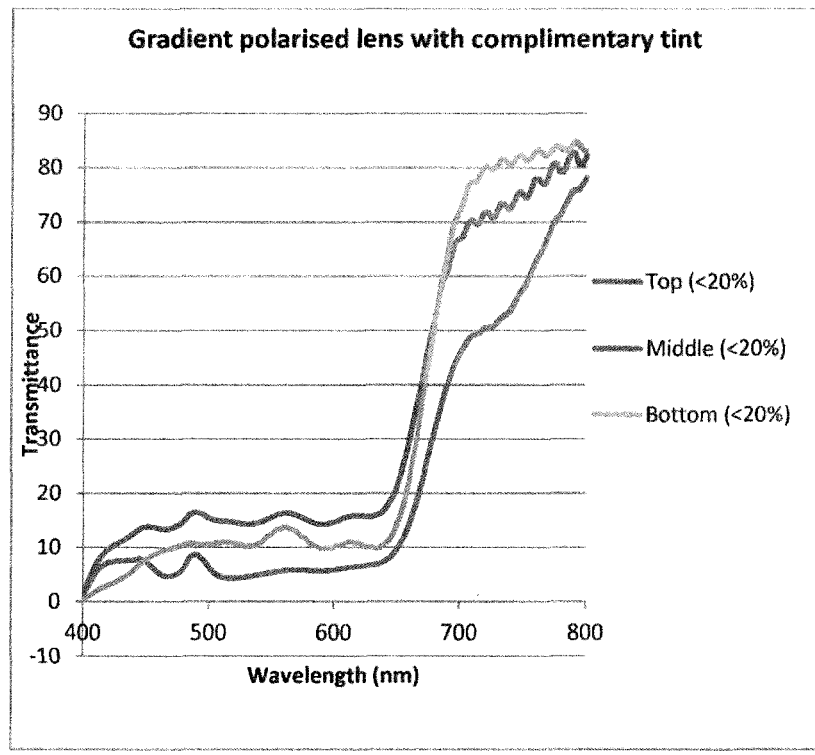
FIG. 3C

GRADIENT POLARIZED OPHTHALMIC LENS

CROSS REFERENCE TO RELATED APPLICATION

This application claims priority of European patent application no. 15201692.9, filed Dec. 21, 2015, the entire content of which is incorporated herein by reference.

FIELD OF THE INVENTION

The present invention relates to ophthalmic lenses for spectacles, particularly for sunglasses, the ophthalmic lenses having a polarization gradient across the lens, for example, such that a distant scene can be viewed through a polarized region (usually an upper region) of the lens, and a near (or other) scene can be viewed through a non-polarized region (usually a lower region) of the lens.

BACKGROUND OF THE INVENTION

Ophthalmic lenses are those that are used in spectacles, for either outdoor or indoor use, typically providing corrective vision for wearers to accommodate for physiological errors in the human eye, but also being plano and being for aesthetic, protective or fashion purposes. Ophthalmic lenses for outdoor use, usually referred to as sunglass lenses, have traditionally been uniformly tinted so as to reduce glare and light transmission for the comfort of the wearer. However, these lenses indiscriminately filter all light whether it is horizontally polarized or vertically polarized—glare is dampened, but not eliminated. More importantly, by filtering all components of light, visual acuity is diminished.

Light is made up of waves traveling in different directions. Vertically polarized light is useful to the human eye, however horizontally polarized light commonly exists in higher proportions as glare. Glare is concentrated light reflecting off a horizontal shiny surface, such as a car windscreen, sand, water, snow or asphalt roads, which reduces visibility and can make it uncomfortable, painful or even dangerous to carry on driving, cycling, skiing, et cetera. Accordingly, polarized ophthalmic lenses were developed for outdoor use that allow the vertically polarized component of light, which is preferred for clear vision, while eliminating the easily scattered and skewed horizontally polarized component of light. Vertically aligned light is preferred because it respects the natural tendency of the visual system to focus on the vertical component of an image.

Typically, polarized ophthalmic lenses include linear polarized filters that utilise aligned dichroic dyes to extinguish the horizontal component of reflected sunlight. In this respect, the components of light that are aligned with the axis of the polarizer are absorbed, allowing only the light oscillating with a wave aligned perpendicular to the axis of the polarizer to pass through the filter.

More recently, popularity and use of smartphones, tablets, laptops, and other devices with polarized displays is increasing. As explained in U.S. Pat. No. 7,374,282 (Robert K. Tendler), hereafter "Tendler", when such polarized displays are viewed with an opposite or crossed orientation through an ophthalmic lens with uniform polarization (being a lens with the same degree of polarization across the entire extent of the lens), the display will appear black due to the cross-polarization effect and will not be viewable.

In that same United States patent, Tendler therefore proposes the use of a polarization gradient across the extent of a lens, such that a distant scene can be viewed through a polarized region (an upper region) of the lens, and a near scene can be viewed through a non-polarized region (a lower region) of the lens, there being either a sharp boundary between the two polarized regions or a variation in polarization from the polarized region to the non-polarized region to avoid the presence of such a sharp boundary. In Tendler, such a lens is suggested for use in sunglasses, with traditional uniform tinting across the lens, but also for use in transparent (untinted) spectacles. Tendler suggests the use of methods such as the stretching of polarization layers, or the provision of adjacent stripes of polarization material of different polarization densities, to achieve the desired gradient polarization.

A subsequent suggestion (see United States patent application publication 2015/0253465 to Giorgio Trapani and Robert K. Tendler, hereafter "Trapani et al"), for a method for producing ophthalmic lenses with a gradient characteristic is to provide a film that has a printable layer (exemplified as a layer of mordant), and to print upon that film a pattern of dots (of predetermined and varying density) with an inkjet printer to thereby provide across the extent of the film a smoothly varying gradient. In this document, gradient characteristics said to be achievable by the method are polarization, transmission and color. Indeed, in order to produce sunglass lenses, Trapani et al suggests incorporating suitable dyes into the printing so as to provide a light transmission gradient across the lens, producing sunglasses having lenses of the type that can be seen in FIG. 1 of Trapani et al, which are said to beneficially provide very little blockage of light when viewed through the lower region of the lens.

Due to the inherent light extinguishing properties of polarized filters in lenses, where one component of light that is aligned parallel with the axis of the polarizer is removed, such gradient polarized lenses, with or without the addition of tint, typically exhibit the type of varying light transmission characteristics across the lens as are described and illustrated in Trapani et al. From an aesthetic point of view, these lenses will appear to have a varying tint across the lens (again, with or without there being an added tint), and from a performance point of view, their ability to function as sunglasses is restricted. Such gradient tints are usually considered more as fashion sunglasses and wearers still experience high levels of transmitted light through the bottom (untinted) portion of the lens.

SUMMARY OF THE INVENTION

It is an object of the invention to provide an ophthalmic lens for spectacles, in particular for sunglasses, where the ophthalmic lens includes a polarization gradient across the lens, but also provides uniform light transmission across the lens. Ideally, such sunglasses are able to function as high performance spectacles or sunglasses with the benefits of polarization, but without the negative impact on the visibility of polarized displays, and without the high light transmission in the lower portion of the lens associated with gradient tinted lenses.

Before turning to a summary of the invention, it must be appreciated that the above description of the prior art has been provided merely as background to explain the context of the invention. It is not to be taken as an admission that any of the material referred to was published or known, or was a part of common general knowledge.

The present invention, for example, provides a polarized ophthalmic lens for spectacles having a polarization gradient with a primary light transmission gradient, characterised in that the ophthalmic lens also includes a secondary light transmission gradient, the secondary light transmission gradient being complementary to the primary light transmission gradient such that the ophthalmic lens exhibits uniform light transmission.

In a preferred form, the ophthalmic lens will be a sunglass lens (either with or without corrective power) having a uniform light transmission in the range of 5 to 80%, but more preferably 10 to 50%, or 10 to 15%. In this respect, and in relation to the term "light transmission", transmission describes the overall intensity of light passing through a lens, typically represented as a percentage compared to the initial amount of light incident upon the lens, sometimes as low as 5% for some specialist forms of sunglasses, or as high as 80% for sunglasses not subjected to high levels of incident light, but normally between about 10% and 50% for a sunglass lens.

Lenses with a high amount of transmission (such as greater than 50%) absorb only low levels of light, allowing a high proportion of light intensity to be transmitted through the lens, which renders them not particularly useful as sunglass lenses, or only useful in limited situations. Lenses with very low transmission (such as from 0% to 5%) will absorb a very high amount of light, providing a lens so dark as to be nearly impossible to see through. The reference to "uniform" with respect to "light transmission" will be understood by a skilled addressee to be a reference to the light transmission being substantially the same across the area of a lens, within the bounds of unavoidable optical variations arising from normal manufacturing tolerances.

Polarized ophthalmic lenses are typically prepared by combining a polarized film within a lens. Polarized films are traditionally absorptive linear polarizers that are positioned in lenses at or near the surface of the lens and aligned horizontally to remove sunlight "glare" reflected from surfaces. Polarized films are commonly formed from polyvinyl alcohol (PVA) imbued with a polarizing material (such as a suitable dye).

In the case of ophthalmic lenses formed from thermoset substrates (such as allyl diglycol carbonate sold under the CR-39® trademark of PPG Industries, Inc.), the polarized film is usually embedded and cast within the lens. To do this, the polarized film is formed/bent to closely match the front surface of the lens, then placed within a lens casting assembly such that lens liquid monomer can be filled and then cured around the polarized film. Typically, the formed/bent polarized film is held close to the front surface utilizing film holding tabs on a gasket used in the lens casting assembly. The polarizer is typically positioned at the front of the lens to avoid depolarizative effects due to birefringent polymer in front of the polarized film. Depending on the specific lens substrate used, the polarized films may be sandwiched between protective layers to protect the polarizing materials from chemicals used in the curing processes, or to provide adequate adhesion between the polarized film and the lens substrate.

In the case of ophthalmic lenses formed from thermoplastic substrates (such as polycarbonate), the polarized film is sandwiched between layers of a similar thermoplastic material to form a polarized wafer. The polarized wafer is then bent to a shape close to the front mold of an injection molding tool. It can then be insert molded to produce an ophthalmic lens with the polarized wafer encapsulated, and strongly bonded, between layers of the lens substrate.

Ophthalmic lenses in accordance with the invention can also be formed using mineral (glass) substrates.

In this specification, the word "gradient" refers to a variation of an optical characteristic from one part of an ophthalmic lens to another, and the word will be used in relation to both variations in light transmission and variations in polarization. Typically, such variations will be gradual and smooth, but the variation may be sharp and sudden, such as a boundary horizontally across the lower region of a lens below which one degree of polarization is provided and above which another, different degree of polarization is provided.

For preparing polarized gradients, printing methods can be used such as those outlined by Trapani et al mentioned above (the whole content of which is incorporated herein by reference), where dichroic dyes are printed as inks onto an oriented film, with the printing intensity varied to provide the gradient.

For example, an oriented film may be imprinted using an inkjet printer with transparent iodine or dichroic dyes, such that the oriented film is selectively stained with the dyes to provide a transparency with the required gradient. In this form, the pattern of the inkjet-printed dyes provide gradient polarization due to the density of the dye dots on the oriented film, where "density" refers to either the size of the dots in terms of lines per inch, or in terms of the actual amount of material deposited in a given location by the inkjet printer.

In a preferred form, a polyvinyl alcohol (PVA) film can be stretched to four times its length to provide the oriented film, and a triacetate cellulose (TAC) substrate can subsequently be bonded to the oriented film for stability and protection. The oriented film can then be overcoated with a layer suitable for receiving print from an inkjet printer, such as a layer of mordant.

In this form, an inkjet printer may then be used to print over the oriented film, made printable by the mordant described above. The printer output is thus a polarized film having gradient polarization, in one form using a dichroic dye which is patterned such that the upper region of the film is heavily dyed, whereas the lower region of the film is virtually undyed, allowing the polarized film to be used in an ophthalmic lens where, similarly, the upper region of the lens is heavily polarized, whereas the lower region of the lens is virtually unpolarized.

In a preferred form, an ophthalmic lens will have a polarized upper region with maximum polarization, and a non-polarized lower region with minimum polarization, with an intermediate region therebetween where the polarization varies gradually, such that the polarization of the ophthalmic lens varies gradually across the lens from the maximum in the upper region to the minimum in the lower region. In a preferred form, wherein the maximum polarization is in the range of from 50 to 98% polarization efficiency, or more preferably greater than 90% polarization efficiency, or greater than 70% polarization efficiency, or greater than 60% polarization efficiency. In a preferred form, the minimum polarization is in the range of from 0 to 50% polarization efficiency, or more preferably less than 10% polarization efficiency, or less than 20% polarization efficiency, or less than 30% polarization efficiency.

However, it will be appreciated that an ophthalmic lens may have regions of differing polarization other than between upper and lower regions, which may for instance be differences between left and right regions, or central and peripheral regions, or annular regions, depending upon the desired uses for such ophthalmic lenses.

As foreshadowed above, as conventional absorptive polarizers remove the component of light aligned with the axis of the polarizer, this also results in reduced light transmission. Absorptive polarizers that provide a gradient in polarization across an ophthalmic lens thus always result in an equivalent gradient in light transmission across the lens, with this resultant light transmission gradient being referred to throughout this specification as a "primary light transmission gradient".

A gradient polarized ophthalmic lens having such a primary light transmission gradient would thus appear identical to a gradient tinted fashion lens, for example, that contained a gradient in light transmission due only to the traditional use of non-dichroic dyes. However, it has been found that if a secondary light transmission gradient is applied, such as a non-polarizing tint, to a gradient polarized ophthalmic lens, the overall light transmission of the lens can be affected without altering the polarization gradient. In this form, the overall light transmission actually results from the cumulative effects of light absorption by polarization and non-polarization.

In a preferred form, this secondary light transmission gradient can be provided by a tinting gradient (which might be referred to as a "reverse" tinting gradient) such that the tinting gradient complements the gradient in polarization to thereby provide a uniform light transmission across the area of the ophthalmic lens. For example, where an ophthalmic lens has an upper region with a maximum degree of polarization and a lower region with a minimum degree of polarization, a uniform light transmission can be obtained through gradient tinting with non-dichroic dyes to a darker state in the lower region compared to the upper region.

A non-polarizing gradient tint may be provided in the following way. A lens which is to receive the gradient tint can be placed in a rack and partially submerged in a fluid, usually water containing a mixture of dyes and dispersing agents. By slowly removing or oscillating the lens, the time each portion of the lens is immersed in the tint bath can be controlled such that the upper region of the lens has less time in the bath and so has high transmission, whereas the lower region of the lens spends more time in the bath and has lower transmission. The rate of gradation between light and dark can be controlled by the withdrawal profile and time spent in the tint fluid. This process can be applied in large baths producing many lenses for non-corrective sunglasses or in small "pair by pair" baths used to produced corrective sunglass lenses to an individual prescription An alternative means to produce the secondary light transmission gradient could be by utilising a retarding filter in front of a polarized film, such as a quarter wave plate retarder. Highly birefringent materials and stressed polymers exhibiting birefringence (of suitable thickness), if placed in front of a polarized film will modify the incident polarized light, changing or modifying its polarizing axis so that this polarized light then passes through the filter.

In relation to the notion of a secondary light transmission gradient being complementary to a primary light transmission gradient, to thereby provide an ophthalmic lens with uniform light transmission, it will be appreciated that non dichroic or non-aligned dichroic dyes will absorb light, equally no matter the angle of polarization. Thus, light intensity can be lowered through absorptive techniques using such dyes without a preferential absorption of light polarized to orientation. Hence, it is possible to construct a lens that has varying degrees of polarization, yet has uniform overall light transmission.

Gradient light transmission has historically been associated with fashion sunglasses. However, this fashion is not desirable for everyone and some wearers would prefer a uniform light transmission across their lenses, but with the added benefits of reduced polarization for viewing digital displays and LCDs, along with the benefits of glare reduction given by polarized lenses. Additionally, gradient light transmission lenses cause variation in the amount of light entering the eye, requiring the pupil to have to adjust for varied lighting conditions, which can lead to issues with perception, particularly in rapidly changing lighting conditions experienced in travel and sports. This perception can be improved by the use of uniform light transmission with gradient polarization.

BRIEF DESCRIPTION OF THE DRAWINGS

The invention will now be described with reference to the drawings wherein:

FIG. 1A is a schematic illustration of a gradient polarized lens with a typical transmission gradient from top to bottom as shown in the table of FIG. 1B and the chart of FIG. 1C;

FIG. 2A is a schematic illustration of a non-polarizing gradient tinted lens with a typical transmission gradient, but now reversed from bottom to top, as shown in the table of FIG. 2B and the chart of FIG. 2C as it would be produced in a typical gradient tinting process; and, FIG. 3A is a schematic illustration of an ophthalmic lens in accordance with an embodiment of the present invention, showing a uniform light transmission across the area of the lens, with a gradient polarization, as shown in the table of FIG. 3B and the chart of FIG. 3C.

DESCRIPTION OF THE PREFERRED
EMBODIMENTS OF THE INVENTION

In general terms, shown in FIGS. 1A to 1C is a typical gradient polarized lens having a high polarizing efficiency and lower light transmission in its upper region (a) and low polarization efficiency and high light transmission in its lower region (c), with a gradual variation in polarization efficiency across its intermediate region (b).

FIGS. 2A to 2C show a typical gradient tinted (non-polarizing) lens as would be produced in a typical gradient tinting process. The lower region (c) of the lens, which in a preferred manufacturing method remains in a tint bath for the longest time, has the lower transmission and the upper region (a), which is hardly exposed to a tinting solution, has the highest light transmission.

FIGS. 3A to 3C then illustrates an exemplary ophthalmic lens which includes a polarization gradient and a secondary light transmission gradient, the secondary light transmission gradient being complementary to the primary light transmission gradient of the polarization gradient such that the lens exhibits uniform light transmission thereacross, but has a high polarizing efficiency at its upper region and a low polarizing efficiency at its lower region.

Aspects of the invention will now be described with reference to the following examples.

Example 1—Plano Sunglass Lenses

A gradient polarized film is produced according to the inkjet printing method described in Trapani et al above. Discs are cut from the film, with the middle of the gradient aligned with notches in a known manner. Discs are bent under the action of heat and pressure to the same curve as the desired lens, and the bent discs are then sandwiched between two glass molds and held at a fixed distance from the front mold by a suitably configured gasket. The spacing between the glass molds is typically 1.8 to 2.2 mm in order to produce a lens suitable for sunglasses with no optical correction.

The sandwiched assembly is then filled with a catalyzed allyl diglycol carbonate monomer and cured over a period of 7 to 21 hours using practices known to those skilled in plastic lens production. After the cure is completed, the lens is removed from the assembly ready to be tinted.

The lens is aligned in a tinting rack and placed in a tinting bath, formulated to produce a complementary gradient color, using techniques known to those skilled in lens tinting processes. However, care is taken to align the lens so that the polarizing axis is perpendicular to the surface of the tinting fluid and so that the polarized portion of the lens is at the top. By tuning the time and depth that the lens is immersed in the tinting bath, a gradient tint of similar color, but which is not polarizing, can be achieved.

In this manner, a lens which has substantially the same light transmission and color from top to bottom, but which has greater than 90% polarizing efficiency in the upper region and low polarizing efficiency in the lower region, can be produced.

Example 2—Semi-Finished Blank and Lens with Corrective Power

A gradient polarized film is produced according to the inkjet printing method described in Trapani et al above. Discs are cut from the film with the middle of the gradient aligned with notches in the normal manner. Discs are bent under the action of heat and pressure to the same curve as the desired lens to form a wafer. Bent wafer is then sandwiched between two glass molds and held at a fixed distance from the front mold (desirably <1 mm) in a suitably configured gasket.

The front and back mold of the assembly are arranged to give front surface curve and lens thickness suitable for a desired lens blank, lens blanks being commonly used to produce ophthalmic lenses with corrective power.

The sandwiched assembly is then filled with initiated allyl diglycol monomer and cured using known techniques. After curing, a semi-finished lens is removed from the sandwich and postcured. Postcuring times and temperatures are designed to further cure the lens and relieve internal stresses from previous polymerisation within the mold cavity.

The semi-finished lens is then aligned in a blocking device in a specific orientation to the polarizing axis. It can then be surfaced to prescription power with the polarizing axis oriented vertically in the wearer's spectacle frames. After surfacing, the lenses can be aligned in a rack, with the horizontal axis of the prescription oriented to the surface of the tinting fluid, thus the polarizing axis will be vertical. The tinting time and depth is then managed such that a gradient tint which is complementary to the polarizing gradient is produced.

The finished lens has a substantially uniform transmission and color from top to bottom, has high polarizing efficiency at the upper region of the lens and low polarizing efficiency at the lower region (a reading zone) and has the wearer's corrective power orientated correctly for the wearer's use once fitted to a frame.

Example 3—Hi-Refractive Index Lens with Corrective Power

A gradient polarized film is produced according to the inkjet printing method described above in Trapani et al. Discs are cut from the film with the middle of the gradient aligned with notches as is common practice. Discs are bent under the action of heat, pressure and humidity to the same curve as a desired lens to form a wafer. The bent wafer is then sandwiched between two glass molds and held at a fixed distance from the front mold with a suitably configured gasket. The front and back mold of the assembly are arranged to give a curve and thickness suitable for a semi-finished lens blank.

Catalyzed urethane lens monomer is then filled into the mold cavity to encase the polarized film. Urethane lens monomers are known to those skilled in the art of hi-index lens manufacture and include, but are not limited to: thio-urethane lens monomer components such as xylylene diisocyanate (XDI), norbornane diisocyanate (NBDI), 2,3 Bis [(2-mercaptoethyl)thio]-1-propanethiol (GST), (bis mercaptomethyl)-3,6,9-trithiaundecane-1,11-dithiol (MR10B), pentaerithritol tetrakis 3-mercaptopropionate (PTMP).

Suitable tin catalysts are used to cure lenses. Such catalysts can include but are not limited to dibutyltin dichloride or dibutyltin dilaurate. Additionally, additives can be included into the lens monomer mix such as UV absorbers and mold release agents known to those skilled in the art.

Filled mold assemblies are then cured in an oven using a temperature program and techniques known to those skilled in the art. Programs and length of cure can vary with desirable cure times being between 20 and 45 hours in order to control the lens cure. After curing the lens is removed from the sandwich and postcured. Postcuring times and temperatures are designed to further cure the lens and relieve internal stresses from previous polymerisation within the mold cavity. The semi-finished lens is then aligned in a blocking device in a specific orientation to the polarizing axis. It can then be surfaced to a prescription power with the polarizing axis oriented vertically for the wearer's normal use. After surfacing, the lenses can be aligned in a rack, with the horizontal axis of the prescription oriented to the surface of the tinting fluid. The tinting time and depth is then managed to produce a gradient tint which is complementary to the polarizing gradient.

The resulting lens has a substantially uniform transmission and color from top to bottom, and has corrective power orientated correctly for the wearer use once fitted to the frame. The lens contains a polarized gradient oriented correctly to suit the wearer, preferably with high efficiency in the upper region of the lens and poor efficiency in the lower region of the lens.

Example 4—Polycarbonate Lens with Corrective Power

A gradient polarized film is produced according to the inkjet printing method described above in Trapani et al. The film is bonded between layers of a polycarbonate film using known processes and adhesives. Discs are cut from the film with the middle of the gradient aligned with notches as is common practice. Discs are bent under the action of heat and pressure to the same curve as the desired lens to form a wafer. Bent wafer is then inserted into the molding cavity of an injection molding tool.

Hot molten polycarbonate is injected into the cavity and behind the film, pressing it against the front molding surface of the tool. The mold is allowed to cool and polycarbonate able to solidify and in doing so the film adheres to the polycarbonate lens.

The polycarbonate semifinished polarized lens is removed from the mold and aligned in a blocking device in specific orientation to the polarizing axis. It can then be surfaced to a prescription power with the polarizing axis oriented vertically for the wearer's normal use.

After surfacing, the lens is hardcoated with a tintable hardcoating such as UVNV from UltraOptics. Surfaced, hardcoated lenses can be aligned in a rack, with the horizontal axis of the prescription oriented to the surface of the tinting fluid. The tinting time and depth is then managed to produce a gradient tint which is complementary to the polarizing gradient.

The resulting lens has a substantially uniform light transmission and color from top to bottom, has corrective power orientated correctly for the wearer use once fitted to the frame. The lens contains a polarized gradient oriented correctly to suit the wearer, preferably with high efficiency in the upper region of the lens and poor efficiency in the lower region of the lens.

It is understood that the foregoing description is that of the preferred embodiments of the invention and that various changes and modifications may be made thereto without departing from the spirit and scope of the invention as defined in the appended claims.

What is claimed is:

1. A polarized ophthalmic lens comprising:
   a polarization gradient having a primary light transmission gradient;
   a secondary light transmission gradient; and,
   said secondary light transmission gradient being complementary to said primary light transmission gradient so as to cause the lens to exhibit uniform light transmission.

2. The polarized ophthalmic lens of claim 1, wherein the ophthalmic lens is a sunglass lens having a uniform light transmission lying in a range of 5 to 80%.

3. The polarized ophthalmic lens of claim 1, wherein the ophthalmic lens is a sunglass lens having a uniform light transmission lying in a range of 10 to 50%.

4. The polarized ophthalmic lens of claim 1, wherein the ophthalmic lens is a sunglass lens having a uniform light transmission lying in a range of 10 to 15%.

5. The polarized ophthalmic lens of claim 2, wherein the ophthalmic lens is a sunglass lens with or without corrective power.

6. The polarized ophthalmic lens of claim 1, wherein:
   the ophthalmic lens includes a polarized upper region with maximum polarization and a non-polarized lower region with minimum polarization;
   the ophthalmic lens further includes an intermediate region disposed between said polarized upper region and said non-polarized lower region; and,
   said intermediate region has a polarization which varies gradually so as to cause the ophthalmic lens to have a lens polarization which varies gradually across the ophthalmic lens from said maximum polarization in said polarized upper region to said minimum polarization in said non-polarized lower region.

7. The polarized ophthalmic lens of claim 6, wherein said maximum polarization lies in the range of 50 to 98% polarization efficiency.

8. The polarized ophthalmic lens of claim 6, wherein said maximum polarization is greater than 90% polarization efficiency.

9. The polarized ophthalmic lens of claim 6, wherein said maximum polarization is greater than 70% polarization efficiency.

10. The polarized ophthalmic lens of claim 6, wherein said maximum polarization is greater than 60% polarization efficiency.

11. The polarized ophthalmic lens of claim 6, wherein said minimum polarization is at least one of in a range of 0 to 50% polarization efficiency, less than 10% polarization efficiency, less than 20% polarization efficiency, and less than 30% polarization efficiency.

12. The polarized ophthalmic lens of claim 1 further comprising a lens substrate configured as one of a thermoset, a thermoplastic and a mineral substrate.

13. The polarized ophthalmic lens of claim 1, wherein said secondary light transmission gradient is provided by a non-polarizing gradient tint.

14. The polarized ophthalmic lens of claim 1, wherein said secondary light transmission gradient is provided by one of a non-dichroic dye and a non-aligned dichroic dye.

15. A process for making a polarized ophthalmic lens having a polarization gradient with a primary light transmission gradient, the lens further including a secondary light transmission gradient, the secondary light transmission gradient being complementary to the primary light transmission gradient so as to cause the lens to exhibit uniform light transmission, the process comprising the steps of:
   a. forming an ophthalmic lens blank with a polarization gradient with a primary light transmission gradient;
   b. surfacing the lens blank to produce a corrective power appropriate to a wearer's prescription;
   c. forming a secondary light transmission gradient by tinting the surfaced lens blank with a complementary non-polarizing gradient tint to provide the lens blank with uniform light transmission; and,
   wherein the tinted and surfaced lens blank results in an ophthalmic lens having a polarization gradient and uniform light transmission.

16. The process of claim 15 further comprising the step of hard coating one of the lens blank and the ophthalmic lens.

17. The process of claim 15, wherein the polarization gradient is provided by a polarized film formed by inkjet printing a layer of a dichroic dye upon a mordant coating on an oriented film.

18. A process for making a polarized ophthalmic lens having a polarization gradient with a primary light transmission gradient, the lens further including a secondary light transmission gradient, the secondary light transmission gradient being complementary to the primary light transmission gradient so as to cause the lens to exhibit uniform light transmission, the process comprising the steps of:
   a. forming an ophthalmic finished lens with a polarization gradient with a primary light transmission gradient from a lens blank;
   b. forming a secondary light transmission gradient by tinting the lens blank with a complementary non-polarizing gradient tint to provide the lens blank with uniform light transmission; and,
   wherein a finished ophthalmic lens with or without corrective power results having a polarization gradient and uniform light transmission.

19. The process of claim 18 further comprising the step of hard coating one of the lens blank and the ophthalmic lens.

20. The process of claim 18, wherein the polarization gradient is provided by a polarized film formed by inkjet printing a layer of a dichroic dye upon a mordant coating on an oriented film.

21. The polarized ophthalmic lens of claim 1 further comprising a glass lens substrate.

* * * * *